United States Patent
Egawa et al.

(10) Patent No.: US 9,197,620 B2
(45) Date of Patent: Nov. 24, 2015

(54) INFORMATION PROCESSING DEVICE AND INFORMATION PROCESSING METHOD

(71) Applicant: YAHOO JAPAN CORPORATION, Tokyo (JP)

(72) Inventors: Tsunayoshi Egawa, Tokyo (JP); Norifumi Matsuya, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 63 days.

(21) Appl. No.: 14/020,195

(22) Filed: Sep. 6, 2013

(65) Prior Publication Data
US 2015/0067778 A1 Mar. 5, 2015

(30) Foreign Application Priority Data
Aug. 29, 2013 (JP) .................. 2013-178671

(51) Int. Cl.
*H04L 29/06* (2006.01)
*H04L 29/08* (2006.01)

(52) U.S. Cl.
CPC ............... *H04L 63/08* (2013.01); *H04L 63/16* (2013.01); *H04L 63/166* (2013.01); *H04L 67/303* (2013.01); *H04L 67/306* (2013.01)

(58) Field of Classification Search
CPC ......... G06F 21/44; G06F 21/45; G06F 21/30; G06F 21/31; H04L 63/16; H04L 63/166
See application file for complete search history.

(56) References Cited

U.S. PATENT DOCUMENTS

| 2008/0242264 A1* | 10/2008 | Malik et al. ................... 455/411 |
| 2010/0157799 A1 | 6/2010 | Nice et al. |
| 2011/0264908 A1* | 10/2011 | Feng et al. .................... 713/153 |
| 2014/0082715 A1* | 3/2014 | Grajek et al. ..................... 726/8 |

FOREIGN PATENT DOCUMENTS

| JP | 2000-339273 A | 12/2000 |
| JP | 2012-165199 A | 8/2012 |
| JP | A-2012-147478 | 8/2012 |
| JP | 2012-195783 A | 10/2012 |

OTHER PUBLICATIONS

Aug. 4, 2015 Office Action issued in Japanese Patent Application No. 2013-178671.

* cited by examiner

*Primary Examiner* — Edward Zee
(74) *Attorney, Agent, or Firm* — Oliff PLC (57) ABSTRACT

An information processing device includes a reception unit and a control unit. The reception unit receives an access request including identification information of a transmission source from a terminal. The control unit acquires user information that is information about a user using the terminal based on the identification information included in the access request.

12 Claims, 9 Drawing Sheets

| USER ID | LOG-IN STATE | IPv6 ADDRESS |
|---|---|---|
| user0101 | y | 2891:0db8::2da1:31a6:0000:268d |
| user0102 | n | 08dc:8954:3c6a:3110::23ad:0031 |
| user0103 | n | 7312:08da:214d:8f3d::ac23:0130 |
| user0104 | n | 41ad::890f:2cdf:032a:3fca:128d |
| user0105 | y | 0cfd:367d:1893:adb3:827f::0021 |

| USER ID | IPv6 ADDRESS | TRANSFER DESTINATION ADDRESS |
|---|---|---|
| user0103 | 7312:08da:214d:8f3d::ac23:0130 | http://www.abcdef.co.jp |
| user0104 | 41ad::890f:2cdf:032a:3fca:128d | http://www.bcdefg.co.jp |
| user0101 | 2891:0db8::2da1:31a6:0000:268d | http://www.cdefgh.co.jp |
| ⋮ | ⋮ | ⋮ |

INFORMATION PROCESSING DEVICE AND INFORMATION PROCESSING METHOD

CROSS-REFERENCE TO RELATED APPLICATIONS

The present application claims priority to and incorporates by reference the entire contents of Japanese Patent Application No. 2013-178671 filed in Japan on Aug. 29, 2013.

BACKGROUND OF THE INVENTION

1. Field of the Invention

The present invention relates to an information processing device and an information processing method.

2. Description of the Related Art

A user may use a shopping site or a paid moving image distribution site from a personal computer or a mobile terminal. Such a site acquires user information (for example, personal information, authentication information, attribute information, and the like) that is information about users using the site. For example, when exemplifying authentication, such a site manages personal information such as addresses, contacts, and credit card numbers of the user, and authentication information such as user IDs and passwords. When a user uses such a site, the user inputs the user ID and the password on a log-in screen to perform user authentication.

In addition, as applications of the mobile terminal, for example, there are a mail application and a moving image player application of a paid moving image distribution site, in which the personal information of the user is used. The user also performs the user authentication when using such an application.

Patent Document 1: Japanese Patent Application Laid-open No. 2012-147478

However, there is a problem that inputting a user ID and a password is cumbersome every time the user logs in.

In a site having a large number of registered users, the IDs of the users may be easily long in many cases. In addition, in a shopping site using credit cards for shopping, passwords may be long to ensure security in many cases. A site may request a user for double user authentication. For this reason, the user may feel the inputting of the user ID and the password cumbersome at the time of log-in to the site. Particularly, when the user logs in through a mobile terminal, the user inputs the user ID and the password by operating a touch panel, and thus the log-in is cumbersome since a time is taken to input characters.

SUMMARY OF THE INVENTION

It is an object of the present invention to at least partially solve the problems in the conventional technology.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Next, embodiments for carrying out the invention will be described with reference to the drawings. In addition, assumptions common with the contents described above in Background and Problem are appropriately omitted. In addition, the same reference numerals and signs are given to the same portions in the following embodiments. The embodiments may be appropriately combined within the scope which does not contradict the process contents. In addition, the information processing device and the information processing method according to the invention are not limited by the embodiments.

First Embodiment

1. Outline of Process

Figure 1:
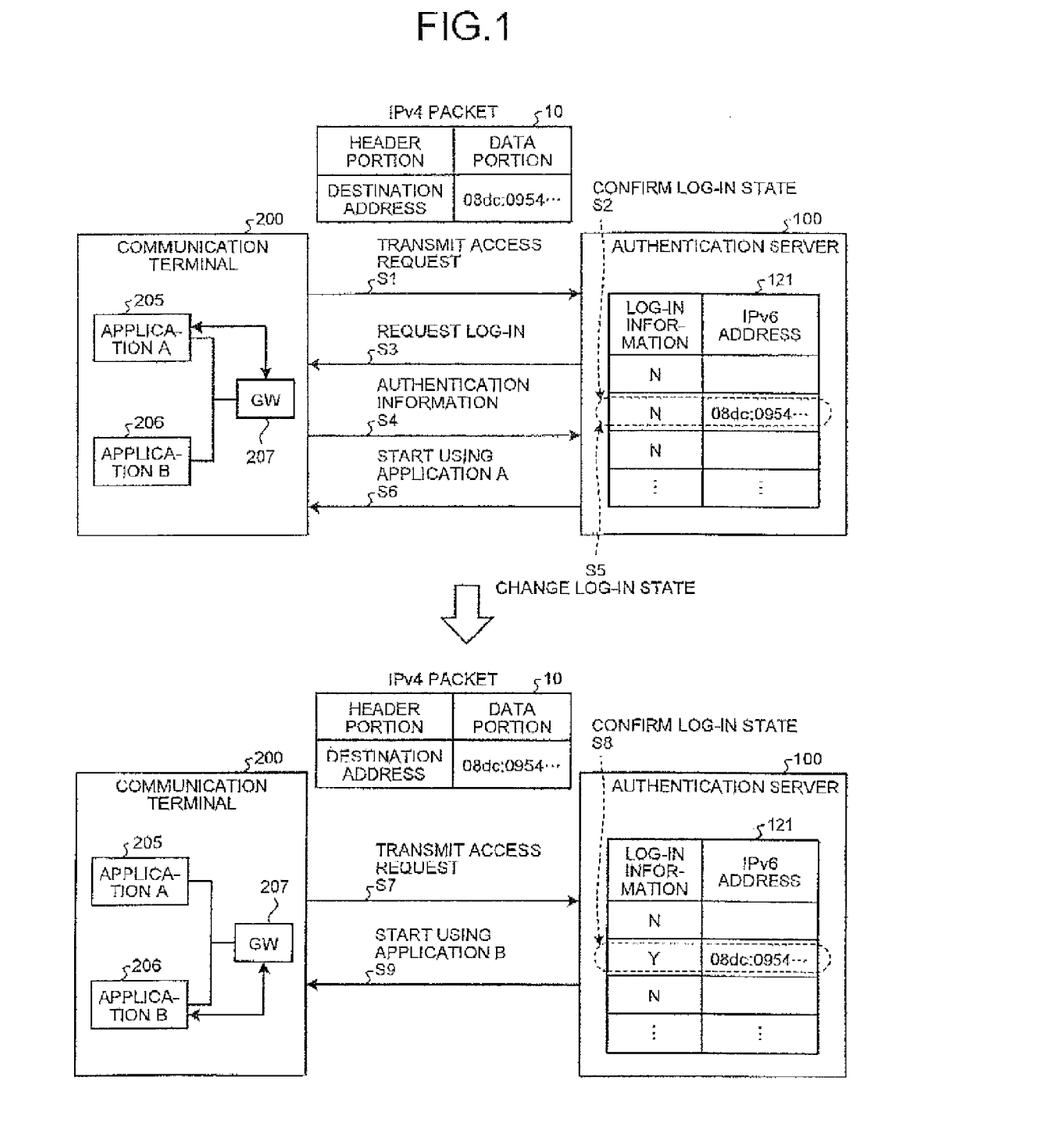
FIG. 1 is a diagram illustrating an outline of a process of log-in of a communication terminal according to a first embodiment to an authentication server.

FIG. 1 is a diagram illustrating an outline of a process in which a communication terminal according to a first embodiment logs in an authentication server. The upper portion of FIG. 1 illustrates a process in which an application A 205 first logs in an authentication server 100 after previous log-out. Meanwhile, the lower portion of FIG. 1 illustrates a process in which an application B 206 logs in the authentication server 100 after the second.

First, the process in which the application A 205 first logs in the authentication server 100 after the previous log-out will be described with reference to the upper portion of FIG. 1. The application A 205 accesses a gate way (GW) 207 that is an application installed in a communication terminal 200. Then, the GW 207 generates an IPv4 packet 10 corresponding to an IPv4 protocol. The IPv4 packet 10 includes a destination address in a header portion, and includes an IPv6 address "08dc:0954:_ (which will not be described hereinafter)" of the communication terminal 200 in a data portion. In addition, the IPv6 address of the data portion is used as transmission source identification information for identifying a user in the authentication server 100. Then the GW 207 transmits an access request including the IPv4 packet 10 to the authentication server 100 in Step S1.

Then, the authentication server 100 receives the IPv4 packet 10 as the access request. Then, the authentication server 100 searches for the IPv6 address "08dc:0954:_" included in the IPv4 packet 10 in an authentication DB 121. Then, the authentication server 100 confirms that the communication terminal 200 is in a non-log-in state with reference to a log-in state corresponding to the IPv6 address "08dc:0954:_" in Step S2.

Then, the authentication server 100 transmits a log-in request to the communication terminal 200 in Step S3, and then the communication terminal 200 displays a log-in screen on a monitor based on the received log-in request. Then, the communication terminal 200 transmits authentication information such as a user ID and a password input to the log-in screen, to the authentication server 100 in Step S4. Then, the authentication server 100 performs log-in authentication based on the received authentication information. Then, the authentication server 100 permits the application A 205 to log in, and changes the log-in state from "N" to "Y" in the authentication DB 121 in Step S5. The application A 205 logs in the authentication server 100 and starts using the authentication server 100 in Step S6. By the above description, the process in which the application A 205 first logs in the authentication server 100 after the previous log-out.

The known security unit (for example, encryption) is appropriately applied to log-in authentication and an instruction (for example, providing a service) based on the log-in authentication.

Next, a process of log-in of the application B 206 to the authentication server 100 after the second will be described with reference to the lower portion of FIG. 1. First, the application B 206 accesses the GW 207. Then, the GW 207 generates an IPv4 packet 10. Then, the GW 207 transmits an access request including the IPv4 packet 10 to the authentication server 100 in Step S7. Then, the authentication server 100 searches for an IPv6 address "08dc:0954:_" included in the IPv4 packet 10 in the authentication DB 121, and confirms in Step S8 that the communication terminal 200 has been already logged in. The application B 206 logs in to the authentication server 100, and starts using the authentication server 100 in Step S9. Accordingly, the process of log-in of the application B 206 to the authentication server 100 after the second is completed.

As described above, when the user accesses the authentication server 100 at the first time after the previous log-in, the input of the authentication information is requested on the log-in screen. However, when the user accesses the authentication server 100 after the second, and the user can log in to the authentication server 100 without the input of the authentication information. Accordingly, it is possible to obtain an effect of reducing troublesomeness of character input at the time of log-in to a site.

Depending on kinds of client terminals used by users, kinds of access lines, and the other conditions, it is not necessarily simple that the server realizing the site acquires the user information. For example, depending on kinds of basic software of smartphones, it is difficult to use so-called cookie information. There are many cases in which an IP address given to a terminal is frequently changed. As a result, it is difficult that the server keeps identification for the user (that is, the terminal), and in the authentication, there is a problem that the inputting of the user ID and the password is cumbersome every time the user logs in. In the invention, each application performs authentication in the authentication server 100 using the IPv6 address assigned to the communication terminal 200, thereby performing log-in. Accordingly, each application may share the log-in state.

2. Configuration of Communication Terminal

Figure 2:
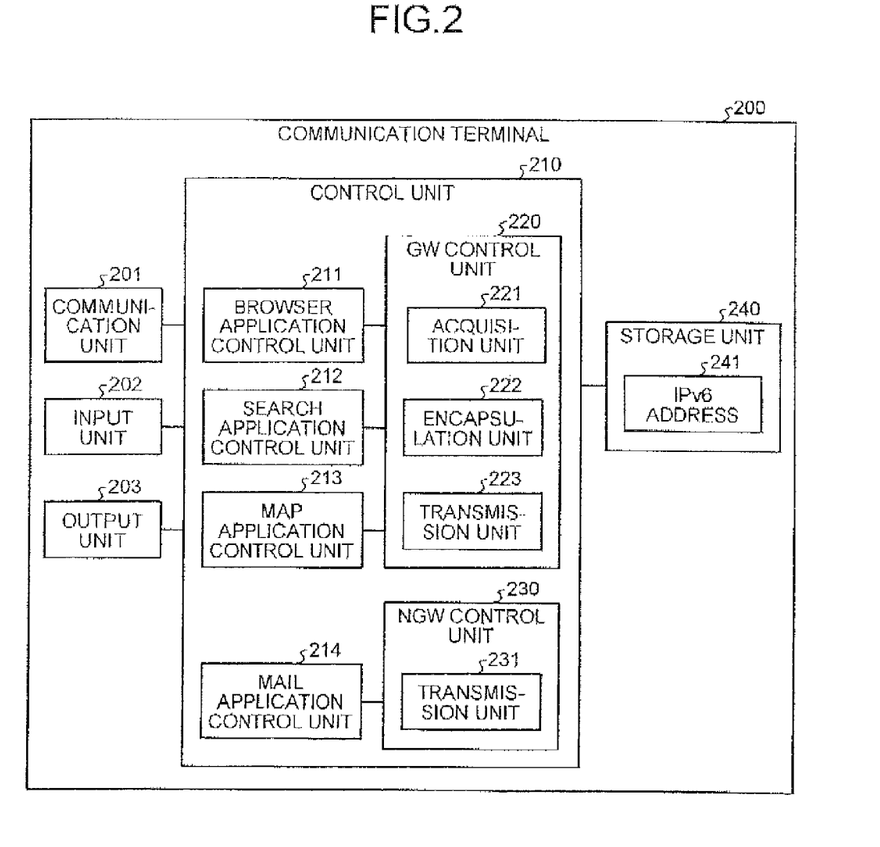
FIG. 2 is a functional block diagram illustrating a configuration of a communication terminal according to the first embodiment.

FIG. 2 is a functional block diagram illustrating a configuration of the communication terminal according to the first embodiment. The authentication server 100 and the communication terminal 200 are connected by a network (not illustrated), and transmits and receives various kinds of information. As a kind of network, there may be an arbitrary communication network such as a local area network (LAN), a virtual private network (VPN), and a mobile communication network, whether wired or wireless. In addition, the communication terminal 200 is a terminal device operated by the user. For example, the communication terminal 200 is an information processing device such as a desktop PC (a personal computer), a tablet PC, and a laptop PC. In addition, the communication terminal 200 may be a smartphone, a personal digital assistant (PDA), and a mobile phone.

The communication terminal 200 includes a communication unit 201, an input unit 202, an output unit 203, a control unit 210, and a storage unit 240. The communication unit 201 transmits a packet generated by the control unit 210 to a base station. The input unit 202 is a touch panel and a keyboard, and is used when inputting a user ID and a password on the log-in screen. The output unit 203 is connected to a display device such as a monitor, and displays a log-in screen and an authentication result. In addition, the control unit 210 may be realized, for example, by an integrated circuit such as an application specific integrated circuit (ASIC) and a field programmable gate array (FPGA). In addition, a function of the control unit 210 may be realized, for example, by a predetermined program executed by a central processing unit (CPU). In addition, the storage unit 240 corresponds to, for example, a semiconductor memory element such as a random access memory (RAM), a read only memory (ROM), and a flash memory, or a storage device such as a hard disk and an optical disk.

First, a configuration of the storage unit 240 will be described. The storage unit 240 stores one piece of transmission source identification information associated with each application. Specifically, the storage unit 240 stores an IPv6 address adapted to an IPv6 protocol, as the transmission source identification information of the user. The IPv6 address may be an address continuously applied to the communication terminal 200 even after the user logs out of the authentication server 100.

Next, a configuration of the control unit 210 will be described. The control unit 210 includes a browser application control unit 211, a search application control unit 212, a map application control unit 213, a mail application control unit 214, a GW control unit 220, and a native gate way (NGW) control unit 230. The browser application control unit 211 controls a web browser application. In addition, the search application control unit 212 controls a search application used when searching for a term in a document. In addition, the mail application control unit 214 controls a mail application. The browser application control unit 211, the search application control unit 212, and the map application control unit 213 communicate with the GW control unit 220. Meanwhile, the mail application control unit 214 communicates with the NGW control unit 230. In addition, the browser application controlled by the browser application control unit 211, the search application controlled by the search application control unit 212, and the map application controlled by the map application control unit 213 are, for example, downloadable applications provided by a manager of the authentication server 100. In addition, the mail application controlled by the mail application control unit 214 communicates with a server other than the authentication server 100.

The GW control unit 220 includes an acquisition unit 221, an encapsulation unit 222, and a transmission unit 223. The acquisition unit 221 acquires the transmission source identification information from the storage unit 240 when accessed by any one of the applications. The encapsulation unit 222 generates a first packet including a second packet including transmission source identification information. The transmission unit 223 transmits the first packet to the authentication server 100. In the embodiment, the GW control unit 220 generates an IPv4 packet including an IPv6 packet and transmits the IPv4 packet to the authentication server 100 by any control of the browser application control unit 211, the search application control unit 212, and the map application control unit 213. In addition, the encapsulation unit 222 is an example of the generation unit. In addition, the GW control unit 220 executes the application of GW 207 illustrated in FIG. 1.

A specific sequence until the IPv4 packet is transmitted to the authentication server 100 will be described. First, the acquisition unit 221 acquires an IPv6 address 241 from the storage unit 240 when the browser application control unit 211 accesses the storage unit 240. Then, the encapsulation unit 222 generates an IPv4 packet 10 including, by encapsulation, the IPv6 packet 20. The header portion of the IPv6 packet 20 includes a transmission destination address represented by the IPv6 address. The transmission unit 223 transmits the generated IPv4 packet 10 to the authentication server 100.

Figure 3:
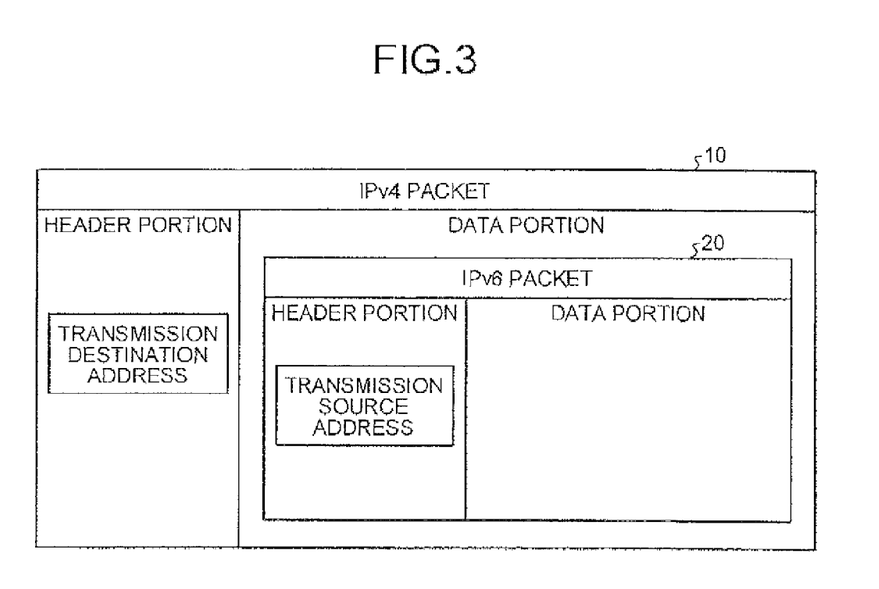
FIG. 3 is a diagram illustrating an example of an IPv4 packet generated in a GW control unit of the first embodiment.

Next, a structure of the IPv4 packet 10 will be described. FIG. 3 is a diagram illustrating an example of the IPv4 packet generated in the GW control unit of the first embodiment. As illustrated in FIG. 3, the IPv4 packet 10 includes a transmission destination address represented by the IPv4 address in the header portion. In addition, the IPv4 packet 10 includes an IPv6 packet 20 in the data portion. Meanwhile, the IPv6 packet 20 includes a transmission source address represented by the IPv6 address in the header portion.

In addition, the NGW control unit 230 generates the IPv4 packet by the control of the mail application control unit 214, and transmits the IPv4 packet from a transmission unit 231.

3. Configuration of Authentication Server According to First Embodiment

Figure 4:
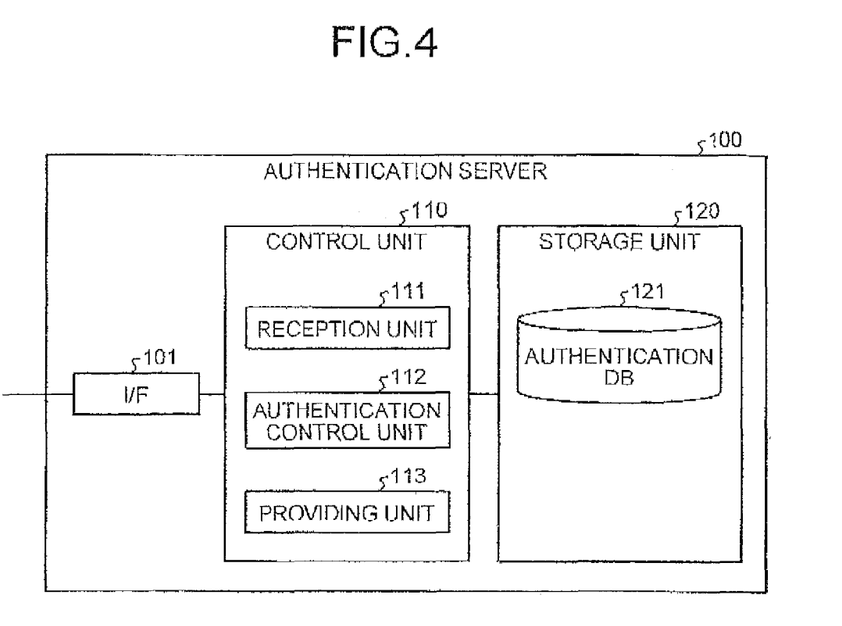
FIG. 4 is a functional block diagram illustrating a configuration of the authentication server according to the first embodiment.

FIG. 4 is a functional block diagram illustrating a configuration of the authentication server according to the first embodiment. The authentication server 100 is an information processing device managing a log-in state. As illustrated in FIG. 4, the authentication server 100 includes an I/F 101, a control unit 110, and a storage unit 120. The I/F 101 is a communication interface for transmitting and receiving data to and from the communication terminal 200 described above through the Internet.

As illustrated in FIG. 4, the storage unit 120 of the authentication server 100 includes one piece of transmission source identification information associated with each application of the terminal, and an authentication DB 121 storing by associating with the log-in state of the terminal. The storage unit 120 corresponds to, for example, a semiconductor memory element such as a random access memory (RAM), a read only memory (ROM), and a flash memory, or a storage device such as a hard disk and an optical disk. In addition, the authentication DB 121 may store by associating user identification information of the user ID with the transmission source identification information and the log-in state of the terminal. In addition, the authentication DB 121 may use the transmission source identification information as the user identification information. That is, the authentication DB 121 may manage the transmission source identification information similarly to the user ID.

Figure 5:
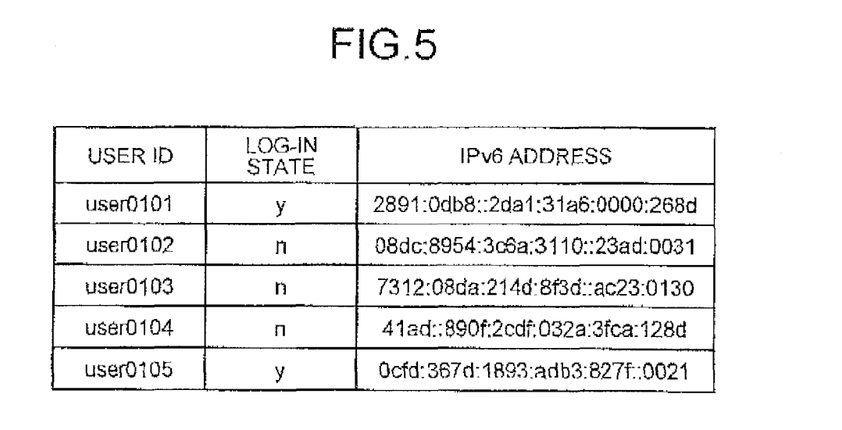
FIG. 5 is a diagram illustrating an example of a data structure of an authentication DB.

The authentication DB 121 is a database managing the log-in state of each user. FIG. 5 is a diagram illustrating an example of a data structure of the authentication DB. As illustrated in FIG. 5, the authentication DB 121 associates a user ID, a log-in state, and an IPv6 address with one another. The "use ID" represents a user identification number for uniquely identifying each user. The "log-in state" is information representing whether the user logs in to the authentication server 100. For example, when the log-in state of the user is "y", it is represented that the user logs in. Meanwhile, when the log-in state is "n", it is represented that the user does not log in. The "IPv6 address" represents the IPv6 address attached to the user.

For example, in a first display line, a user having a user ID of "user0101" is in a logged-in state, and it is represented that IPv6 address is "2891:0db8::2da1:31a6:0000:268d". In addition, in the second display line, a user having a user ID of "user0102" is in a non-logged-in state, and it is represented that IPv6 address is "08dc:8954:3c6a:3110::23ad:0031". In addition, the user of other user ID may be associated with the log-in state and the IPv6 address.

Meanwhile, as illustrated in FIG. 4, the control unit 110 of the authentication server 100 includes a reception unit 111, an authentication control unit 112, and a providing unit 113. The reception unit 111 receives an access request including transmission source identification information from an arbitrary application. In addition, the authentication control unit 112 controls whether to request the authentication information to the terminal based on the log-in information stored in the storage unit 120 in association with the transmission source identification information included in the access request. The authentication control unit 112 does not request the authentication information to the terminal when the log-in state corresponding to the transmission source identification information included in the access request represents logging-in, and requests the authentication information to the terminal when the log-in state represents non-logging-in. In addition, the providing unit 113 provides a service corresponding to the transmission source identification information to the user.

A function of the control unit 110 may be realized, for example, by an integrated circuit such as an application specific integrated circuit (ASIC) and a field programmable gate array (FPGA). In addition, a function of the control unit 110 may be realized, for example, by a predetermined program executed by a central processing unit (CPU).

The process of the control unit 110 illustrated in FIG. 4 will be described in the flow of the process of the authentication server 100. The authentication server 100 processes the following when the browser application control unit 211 of the communication terminal 200 first logs in from the previous log-out. First, the reception unit 111 receives the IPv4 packet 10 from the browser application control unit 211 through the I/F 101. As described above, the IPv4 packet 10 includes the IPv6 packet 20, and the IPv6 packet 20 includes an IPv6 address of the transmission source as the transmission source identification information. Then, the reception unit 111 takes out the received IPv6 packet 20 from the IPv4 packet 10, and extracts the IPv6 address of the transmission source from the header portion of the IPv6 packet 20.

Then, the authentication control unit 112 searches for a user ID corresponding to the extracted IPv6 address in the authentication DB 121 of FIG. 4. For example, when the IPv6 address is "08dc:8954:3c6a:3110::23ad:0031", the authentication control unit 112 confirms that the user having the user ID of "user0102" does not log in, in the second display line of the authentication DB 121. Then, the authentication control unit 112 displays the log-in screen on the monitor of the communication terminal 200 to promote inputting of a user ID and password. Then, when the input user ID and password are correct, the authentication control unit 112 changes the log-in state corresponding to the user of the authentication DB 121 from "n" to "y". Then, the authentication control unit 112 permits the browser application control unit 211 to log in. The providing unit 113 provides a service to the browser application control unit 211 of the communication terminal 200. As described above, the first log-in process of the communication terminal 200 is completed.

Then, the authentication server 100 processes the following when the search application control unit 212 second logs in, in a state in which the browser application control unit 211 logs in. First, the reception unit 111 receives the IPv4 packet 10 from the GW control unit 220 through the I/F 101. Then, the reception unit 111 takes out the IPV6 packet 20 from the received IPv4 packet 10, and extracts the IPv6 address of the transmission source from the header portion of the IPv6 packet 20.

Next, the authentication control unit 112 searches for a user ID corresponding to the extracted IPv6 address in the authentication DB 121. For example, when the IPv6 address is "08dc:8954:3c6a:3110::23ad:0031", the authentication control unit 112 confirms that the user having the user ID of "user0102" has already logged in, in the second display line of the authentication DB 121. Then, the authentication control unit 112 permits the search application control unit 212 to log in. The providing unit 113 provides a service to the search application control unit 212 of the communication terminal 200. That is, the authentication control unit 112 does not request the authentication information such as inputting of the user ID and the password and permits log-in when the communication terminal 200 second logs in from the other application. As described above, the second log-in process of the communication terminal 200 is completed.

In addition, the authentication server 100 may change the log-in state from "y" to "n" when any operation is not performed even when a predetermined time is elapsed after the log-in.

4. Effect

As described above, the information processing device according to a first aspect includes a reception unit configured to receive an access request including identification information of a transmission source from a terminal, and a control unit configured to acquire user information that is information about a user using the terminal based on the identification information included in the access request. Accordingly, it is possible to recognize the user by the identification information of the transmission source included in the access request transmitted from the terminal, and thus it is possible to obtain an effect of simply acquiring the user information.

In addition, the information processing device according to a second aspect further includes a storage unit configured to store one identification information corresponding to each application of the terminal and a log-in state of the terminal, wherein the reception unit receives an access request including the identification information from an arbitrary application, and an authentication control unit configured to control whether to request the authentication information to the terminal based on the log-in state information stored in the storage unit corresponding to the identification information included in the access request. Accordingly, it is possible to automatically perform user authentication only by accessing a site even when a user does not input a user ID and a password at the time of log-in, and thus troublesomeness of character input is reduced at the time of log-in to a site.

In addition, in the information processing device according to a third aspect, the authentication control unit does not request the authentication information to the terminal when the log-in state corresponding to the identification information included in the access request represents logging-in, and requests the authentication information to the terminal when the log-in state represents non-logging-in. Accordingly, the communication terminal can share the log-in state among a plurality of applications, and thus it is possible to obtain an effect of reducing troublesomeness of character input of user authentication information when the user logs in to a site.

In addition, in the information processing device according to a fourth aspect, the reception unit receives a first packet including, by encapsulation, a second packet including the identification information, as the access request, and the authentication control unit controls whether to request the authentication information based on the log-in state corresponding to the identification information included in the second packet.

In addition, in the information processing device according to a fifth aspect, the reception unit receives an IPv6 packet as the access request, and the authentication control unit uses a transmission source IP address set in the IPv6 packet received by the reception unit, as the identification information. Accordingly, it is possible to obtain an effect of performing log-in authentication by the identification information of the packet included in any packet.

In addition, the information processing device according to a sixth aspect further includes a transfer unit configured to extract a second IPv4 packet, from a first IPv4 packet including, by additional encapsulation, the IPv6 packet including, by encapsulation, the second IPv4 packet including a transfer destination address, and transfers the second IPv4 packet to a device corresponding to a transfer destination address, wherein the reception unit allows the storage unit to further store history information in which the transmission source address included in the IPv6 packet is associated with the transmission destination address included in the second IPv4 packet. Accordingly, a currently used communication network corresponds to IPv4. However, even when a future communication network corresponds to IPv6, it is possible to obtain an effect that it is possible to continuously use the information processing device according to the aspect by transmitting only the IPv6 packet part.

In addition, the information processing device according to a seventh aspect further includes a providing unit configured to provide a service corresponding to the identification information to a user. Accordingly, it is possible to obtain an effect that the user can receive a service corresponding to the identification information.

In addition, the communication terminal according to an eighth aspect includes a storage unit configured to store one identification information corresponding to each application, an acquisition unit configured to acquire the identification information from the storage unit when being accessed by any one of the applications, a generation unit configured to generate a first packet including a second packet including the identification information, and a transmission unit configured to transmit the first packet to the user authentication device according to the first aspect. Accordingly, it is possible to obtain an effect that the communication terminal can share the log-in state among a plurality of applications.

5. Other Embodiments According to First Embodiment

User Registration

The authentication server 100 may determine that user registration information is non-registration when the IPv6 address of the transmission source taken out from the IPv4 packet 10 is not included in the authentication DB 121. In this case, the authentication server 100 may display a user information registration format for setting the user registration information such as an address and a name, and the authentication information such as a user ID and a password, on the monitor of the communication terminal 200 to promote user registration.

Embodiment of Changing Address after Log-in

In addition, the IPv6 address attached to the communication terminal 200 keeps the same address at the time of log-in, and the other address may be given at the time of next log-in after the user logs out of the authentication server 100. In this case, the authentication server 100 performs the following process.

The authentication server 100 processes the following when the browser application control unit 211 of the communication terminal 200 first logs in from the previous log-out. First, the reception unit 111 extracts the IPv6 address of the transmission source from the received IPv4 packet 10. Then, the authentication control unit 112 searches a user ID corresponding to the extracted IPv6 address in the authentication DB 121. Then, when there is no user ID corresponding to the IPv6 address, the authentication control unit 112 displays the log-in screen on the monitor of the communication terminal 200 to promote inputting of a user ID and a password. Then, when the user ID and the password are correct, the authentication control unit 112 changes the log-in state corresponding to the user of the authentication DB 121 from "n" to "y", and updates the IPv6 address to the IPv6 address of the transmission source. The authentication control unit 112 permits the browser application control unit 211 to log in. Accordingly, the authentication server 100 can perform user authentication by the IPv4 packet 10 received from the communication terminal 200 when the communication terminal 200 next accesses. The plurality of applications of the communication terminal 200 can share the log-in state.

Use of User Attribute and Position Information

In addition, the authentication server 100 may identify a user ID from the IPv6 address of the transmission source to provide a service corresponding to the user ID to the user. In the embodiment, it is described that the communication terminal 200 transmits the IPv6 address included in the header portion of the IPv6 packet, but the communication terminal 200 may transmit the user information included in the data portion of the IPv6 packet. For example, the communication terminal 200 may store current position information acquired by a global positioning system (GPS) in the data portion of the IPv6 packet 20, as the user information. The authentication server 100 may take out the current position information from the IPv6 packet 20, and may transmit weather information and information corresponding to a current position of a neighboring food and beverage store to the communication terminal 200. In addition, the user information included in the data portion of the IPv6 packet is not limited to the current position information or a region (for example, an administrative district) to which the current position information belongs, and may be attributes of a user, for example, the sex, age, a job category, theme of interest as a target, and the like.

The authentication server 100 receives the user information when the communication terminal 200 logs in, acquires the user ID by the IPv6 address in the authentication DB 121, and transmits the user ID and the user information to a management server managing the user information. The management server registers the user information as the user attribute in association with the user ID. The providing unit 113 may provide a service such as advertisement to the logged-in user using the user attribute registered in the management server. Accordingly, the authentication server 100 may provide a service adapted to the user attribute to the logged-in user. In addition, the authentication server 100 may register the user information as the user attribute in the authentication DB 121.

Authentication Using Only Password

In addition, the authentication control unit 112 may promote only inputting of a password to perform user authentication with only the IPv6 address and password without promoting the inputting of a user ID in the first log-in process of the communication terminal 200. Specifically, the reception unit 111 extracts the IPv6 address of the transmission source from the received IPv4 packet 10. Then, the authentication control unit 112 confirms that the accessed user does not log in by the IPv6 address of the transmission source. Then, the authentication control unit 112 displays the log-in screen on the monitor of the communication terminal 200 to promote only inputting of a password. Then, when the input password is correct, the authentication control unit 112 changes the log-in state corresponding to the user of the authentication DB 121 from "n" to "y". Then, the authentication control unit 112 permits the log-in from the communication terminal 200. The providing unit 113 provides a service to the communication terminal 200. Accordingly, the authentication control unit 112 performs user authentication by only the input password.

Trend in Technical Field of Invention

In addition, the total number of addresses in the IPv4 protocol is 4.2 billion, but the total number of addresses in the IPv6 protocol is $3.4 \times 10^{38}$, and the IPv6 protocol has a broad address space. In the IPv4 network, it is avoided that the IPv4 addresses are exhausted by circularly using one address among a plurality of users when each user communicates using the IPv4 protocol. However, the IPv6 network has the address space sufficient to assign a fixed address to each user, and it is not necessary to circularly use one address. In addition, for a carrier of the mobile terminal, it is possible to assign a fixed IP address to a mobile terminal in a 3G line. Accordingly, it is thought that the carrier of the mobile terminal broadens a service of assigning the fixed IPv6 address to the user accessing a site from the mobile terminal.

6. Operation According to First Embodiment

Figure 6:
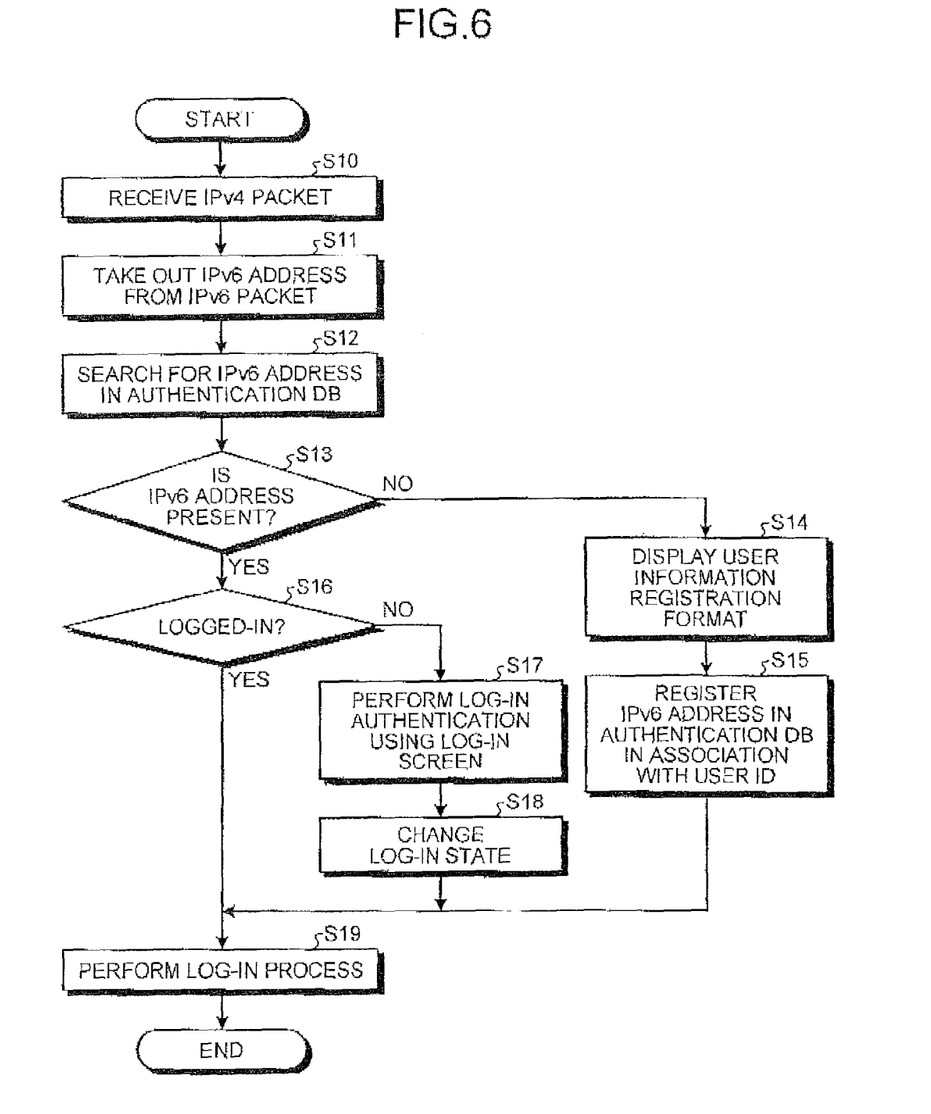
FIG. 6 is a flowchart illustrating flow of a log-in process of the authentication server according to the first embodiment.

Next, a flow of a process until the communication terminal 200 logs in to the authentication server 100 will be described. FIG. 6 is a flowchart illustrating a flow of a log-in process of the authentication server according to the first embodiment. As illustrated in FIG. 6, first, the reception unit 111 of the authentication server 100 receives the IPv4 packet in Step S10. Then, the reception unit 111 takes out the IPv6 address of the transmission source from the IPv6 packet included in the received IPv4 packet in Step S1. Then, the authentication control unit 112 searches the IPv6 address in the authentication DB 121 in Step S12.

When there is no IPv6 address in the authentication DB 121 (No in Step S13), the authentication control unit 112 displays a user information registration format on the monitor of the communication terminal 200 in Step S14. Then, the authentication control unit 112 registers the IPv6 address in the authentication DB 121 in association with the user ID input to the user information registration format in Step S15. Then the authentication control unit 112 permits log-in and performs a log-in process in Step S19.

Meanwhile, when there is an IPv6 address in the authentication DB 121 (Yes in Step S13), the authentication control unit 112 confirms the log-in state of the authentication DB 121, and determines in Step S16 whether the user logs in. When the user does not log in (No in step S16), the authentication control unit 112 displays the log-in screen on the monitor of the communication terminal 200, and performs log-in authentication in Step S17. Then, the authentication control unit 112 changes the log-in state to a log-in-completed state in Step S18. Then, the authentication control unit 112 permits log-in, and performs a log-in process in Step S19.

Meanwhile, when the user logs in (Yes in Step S16), the authentication control unit 112 does not request the authentication information such as inputting of a user ID and a password, permits log-in, and performs a log-in process in Step S19.

Second Embodiment

7. Configuration of Authentication Server According to Second Embodiment

Figure 7:
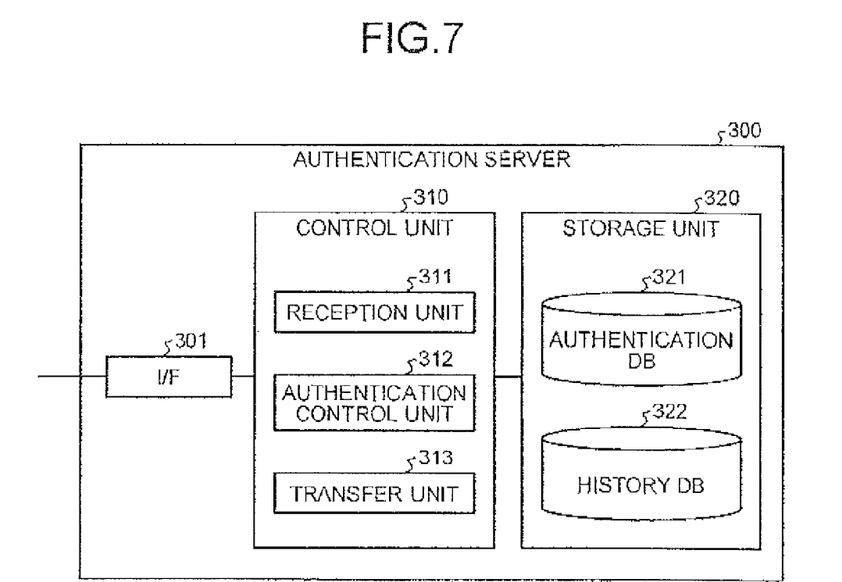
FIG. 7 is a functional block diagram illustrating a configuration of an authentication server according to a second embodiment.

FIG. 7 is a functional block diagram illustrating a configuration of an authentication server according to a second embodiment. The authentication server 300 illustrated in FIG. 7 serves as a relay server when the communication terminal 200 tries to transmit a packet to the other server. As illustrated in FIG. 7, the authentication server 300 includes an I/F 301, a control unit 310, and a storage unit 320. The I/F 301 is a communication interface used when the communication terminal 200 transmits data to the other server.

Figure 8:
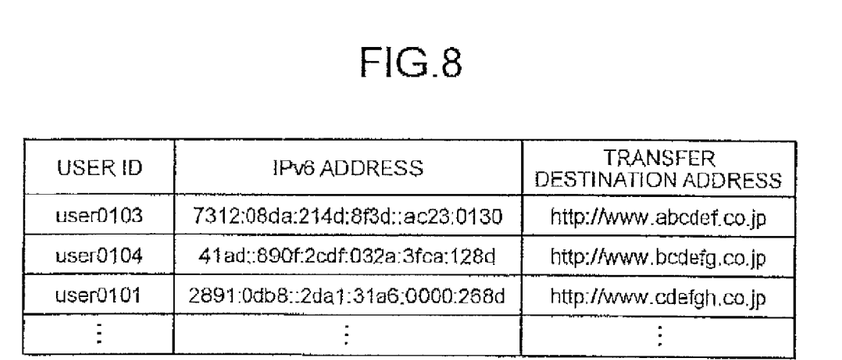
FIG. 8 is a diagram illustrating an example of a data structure of a history DB.

As illustrated in FIG. 7, the storage unit 320 of the authentication server 300 includes an authentication DB 321, and a history DB 322. The history DB 322 is a database records a connection history of a user. FIG. 8 is a diagram illustrating an example of a data structure of the history DB. As illustrated in FIG. 8, the history DB 322 associates a user ID, an IPv6 address, and a transfer destination address with one another. The "use ID" represents a user identification number for uniquely identifying each user. The "IPv6 address" represents an IPv6 address attached to each user. The "transfer destination address" represents an address of a server which the user tries to access. In addition, the data structure of the authentication DB 321 is the same as that of the first embodiment.

For example, the history DB 322 represents that the IPv6 address of the transmission source is "7312:08da:214d:8f3d::ac23:0130" and the user having a user ID of "user0103" in the first display line accesses a server of a transfer destination address "http://www.abcdef.co.jp". In addition, the history DB 322 represents that the IPv6 address of the transmission source is "41ad::890f:2cdf:032a:3fca:3fa:128d" and the user having a user ID of "user0104" in the second display line accesses a server of a transfer destination address "http://www.bcdefg.co.jp". In addition, the history DB 322 stores a connection history even in the other display line.

Meanwhile, as illustrated in FIG. 7, the control unit 310 of the authentication server 300 includes a reception unit 311, an authentication control unit 312, and a transfer unit 313. The reception-unit 311 further stores history information in which the transmission source address included in the second IPv4 packet is associated with the transmission destination address included in the second IPv4 packet, in the storage unit 320. The transfer unit 313 extracts the second IPv4 packet from the first IPv4 packet including, by additional encapsulation, the IPv6 packet including, by encapsulation, the second IPv4 packet including the transfer destination address, and transmits the second IPv4 packet to a device corresponding to the transmission destination address.

The process of the control unit 310 illustrated in FIG. 7 will be described in the flow of the process of the authentication server 300. First, the reception unit 311 receives an IPv4 packet 11 from the browser application control unit 211 through the I/F 301.

Figure 9:
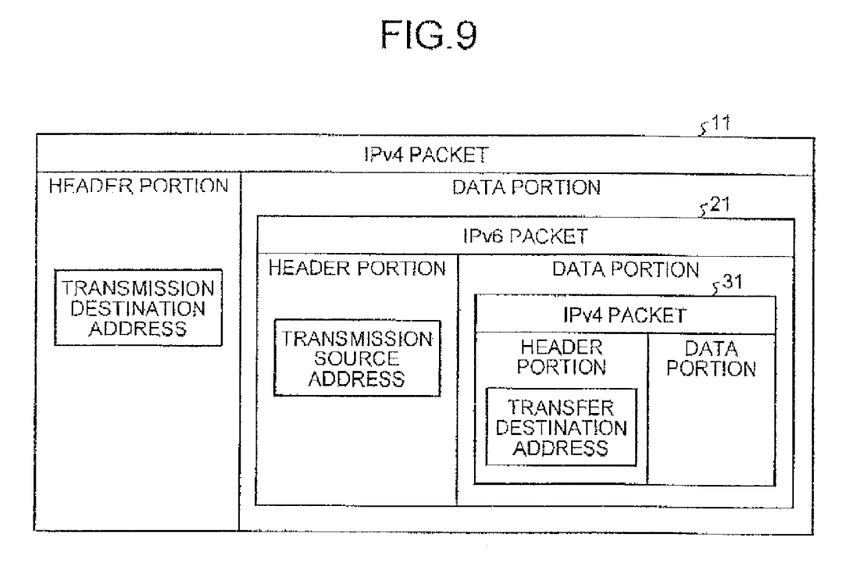
FIG. 9 is a diagram illustrating an example of an IPv4 packet generated in a GW control unit of the second embodiment.

A structure of the IPv4 packet 11 will be described. FIG. 9 is a diagram illustrating an example of the IPv4 packet generated by the GW control unit of the second embodiment. As illustrated in FIG. 9, the IPv4 packet 11 includes the transmission destination address in the header portion, and includes an IPv6 packet 21 in the data portion. In addition, the IPv6 packet 21 includes the transmission source address in the header portion, and includes an IPv4 packet 31 in the data portion. In addition, the IPv4 packet 31 includes the transmission destination address in the header portion. In addition, the transfer destination address represents the address of the authentication server 300, and the transmission destination address represents an address of a server the user tries to access.

Then, the reception unit 311 takes out the IPv6 packet 21 from the data portion of the received IPv4 packet 11. Then, the reception unit 311 extracts the transmission source address from the header portion of the IPv6 packet 21, and takes out the IPv4 packet 31 from the data portion. In addition, the reception unit 311 extracts the transfer destination address from the header portion of the IPv4 packet 31.

Then, the authentication control unit 312 searches for a user ID corresponding to the extracted IPv6 address in the authentication DB 321 of FIG. 5. Then, the authentication control unit 312 confirms that the corresponding user ID is "user0103" when the IPv6 address is "7312:08da:214d:8f3d::ac23:0130". Then, the authentication control unit 312 stores by associating the user ID "user0103", the IPV6 address "7312:08da:214d:8f3d::ac23:0130", and the transmission destination address "http://www.bcdefg.co.jp" with each other in the history DB 322. Then, the transfer unit 313 transfers the IPv4 packet 31 taken out by the reception unit 311 to a server of the transfer destination.

Accordingly, the authentication server 300 can acquire an access history of the user to the other server. The access history may be used, for example, when advertisement corresponding to user's interests is delivered.

8. Operation According to Second Embodiment

Figure 10:
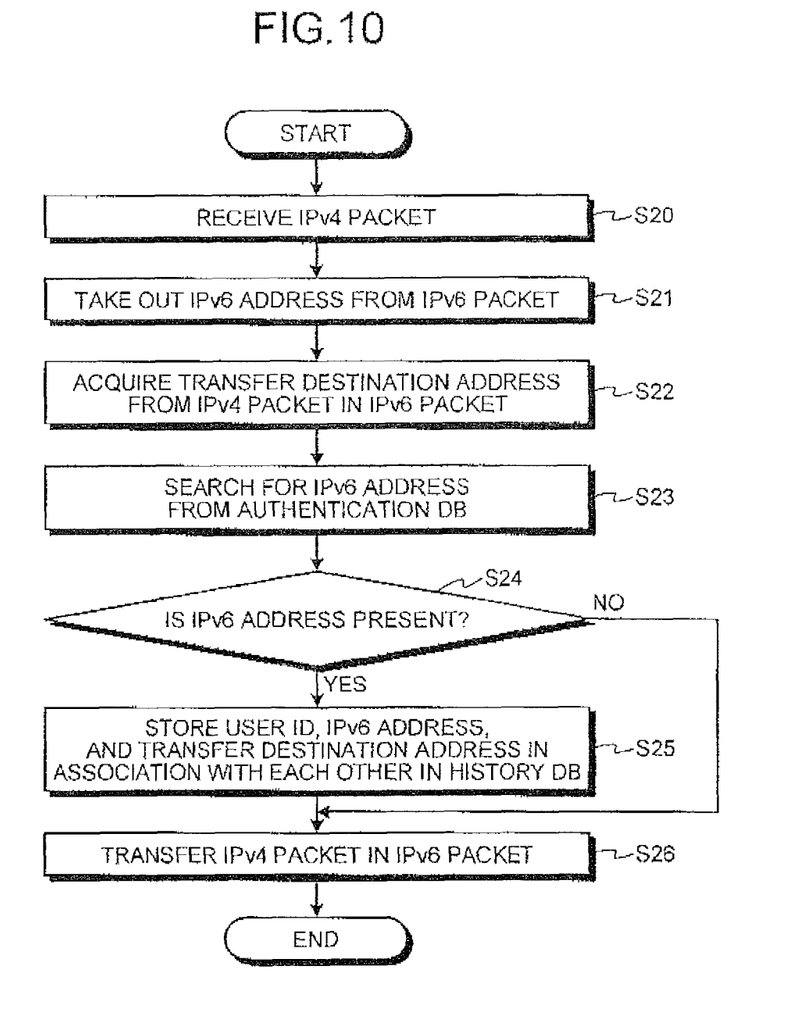
FIG. 10 is a flowchart illustrating a flow of a process until the authentication server according to the second embodiment transfers a packet to another server.

Next, the flow of a process until the authentication server 300 transfers a packet to the other server will be described. FIG. 10 is a flowchart illustrating the flow of the process until the authentication server according to the second embodiment transfers the packet to the other server. As illustrated in FIG. 10, first, the reception unit 311 of the authentication server 300 receives the IPv4 packet 11 in step S20. Then, the reception unit 311 takes out the IPv6 address from the IPv6 packet 21 included in the received IPv4 packet 11 in Step S21. Then, the reception unit 311 takes out the IPv4 packet 31 included in the IPv6 packet 21. Then, the reception unit 311 acquires the transfer destination address from the IPv4 packet 31 in Step S22.

Then, the authentication control unit 312 searches for the IPv6 address in the authentication DB 321 in Step S23. When there is no IPv6 address in the authentication DB 321 (No in Step S24), the transfer unit 313 transmits the IPv4 packet 31 included in the IPv6 packet 21 to the other server of the transfer destination in Step S26.

Meanwhile, when there is the IPv6 address in the authentication DB 321 (Yes in step S24), the authentication control unit 312 associates and stores the user ID, the IPv6 address, and the transfer destination address in the history DB 322 in Step S25. The transfer unit 313 transfers the IPv4 packet 31 to the other server of the transfer destination in Step S26.

9. Hardware Configuration of Authentication Server

Figure 11:
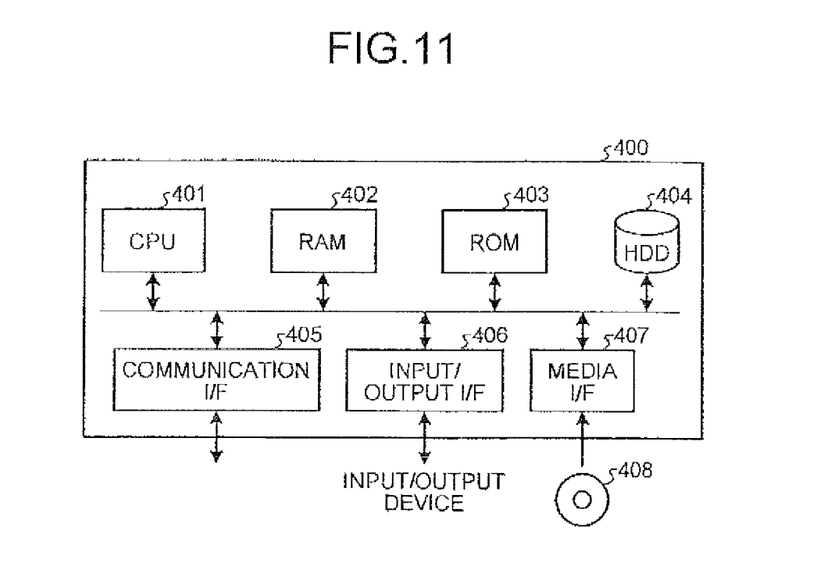
FIG. 11 is a hardware configuration diagram illustrating an example of a computer realizing a function of an authentication server.

The authentication server 100 of the first embodiment or the authentication server 300 of the second embodiment is realized by, for example, a computer 400 having a configuration described in FIG. 11. FIG. 11 is a diagram of a hardware configuration illustrating an example of the computer 400 realizing the function of the authentication server. The computer 400 includes a central processing unit (CPU) 401, a random access memory (RAM) 402, a read only memory (ROM) 403, a hard disk drive (HDD) 404, a communication interface (I/F) 405, an input/output interface (I/F) 406, and a media interface (I/F) 407.

The CPU 401 is operated by a program stored in the ROM 403 or the HDD 404 to control the units. The ROM 403 stores a boot program executed by the CPU 401 at the time of operating the computer 400, and a program depending on hardware of the computer 400.

The HDD 404 stores a program executed by the CPU 401 and data used by the program. The communication interface 405 receives data from the other device through the communication line, transmits the data to the CPU 401, and transmits the data generated by the CPU 401 to the other device through the communication line.

The CPU 401 controls an output device such as a display and a printer, and an input device such as a keyboard and a mouse through the input/output interface 406. The CPU 401 acquires data from the input device through the input/output interface 406. In addition, the CPU 401 outputs the generated data to the output device through the input/output interface 406.

The media interface 407 reads a program or data stored in a recording medium 408 and provides the program or data to the CPU 401 through the RAM 402. The CPU 401 loads the program on the RAM 402 from the recording medium 408 through the media interface 407, and executes the loaded program. The recording medium 408 is, for example, an optical recording medium such as a digital versatile disc, a phase change rewritable disk (PD), a magneto-optical recording medium such as a magneto-optical disk, a tape medium, a magnetic recording medium, or a semiconductor memory.

When the computer 400 serves as the authentication server 100 of the embodiment in the first embodiment, the CPU 401 of the computer 400 executes the program loaded on the RAM 402 to realize the functions of the reception unit 111, the authentication control unit 112 and the providing unit 113. In addition, the authentication DB 121 is stored in the HDD 404.

10. Hardware Configuration of Communication Terminal

Figure 12:
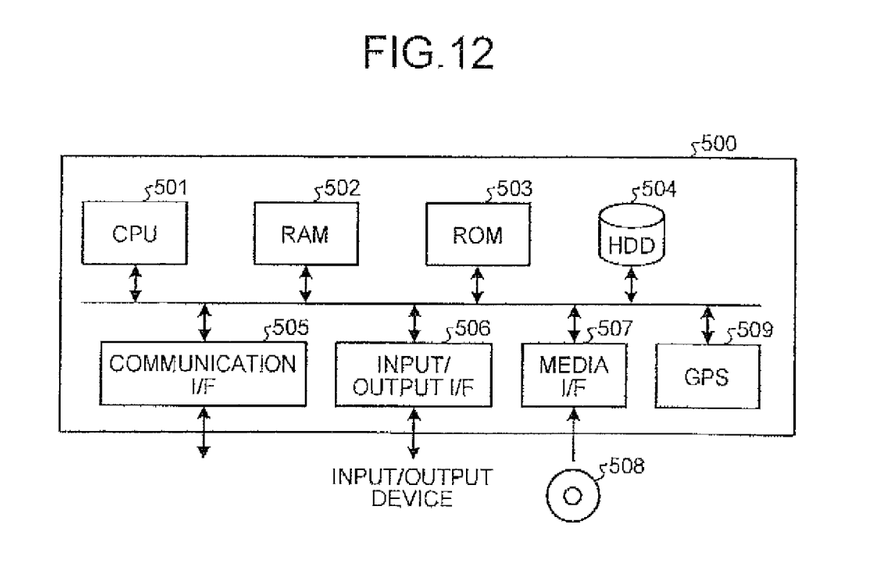
FIG. 12 is a hardware configuration diagram illustrating an example of a computer realizing a function of a communication terminal.

The communication terminal 200 in the first embodiment is realized, for example, by a computer 500 having a configuration illustrated in FIG. 12. FIG. 12 is a diagram of a hardware configuration illustrating an example of the computer 500 realizing the function of the communication terminal. The computer 500 includes a central processing unit (CPU) 501, a random access memory (RAM) 502, a read only memory (ROM) 503, a hard disk drive (HDD) 504, a communication interface (I/F) 505, an input/output interface (I/F) 506, a media interface (I/F) 507, and a GPS 509.

The CPU 501 is operated by a program stored in the ROM 503 or the HDD 504 to control the units. The ROM 503 stores a boot program executed by the CPU 501 at the time of operating the computer 500, and a program depending on hardware of the computer 500.

The HDD 504 stores a program executed by the CPU 501 and data used by the program. The communication interface 505 receives data from the other device through the communication line, transmits the data to the CPU 501, and transmits the data generated by the CPU 501 to the other device through the communication line.

The CPU 501 controls an output device such as a display and a printer, and an input device such as a keyboard and a mouse through the input/output interface 506. The CPU 501 acquires data from the input device through the input/output interface 506. In addition, the CPU 501 outputs the generated data to the output device through the input/output interface 506.

The media interface 507 reads a program or data stored in a recording medium 508 and provides the program or data to the CPU 501 through the RAM 502. The CPU 501 loads the program on the RAM 502 from the recording medium 508 through the media interface 507, and executes the loaded program. The recording medium 508 is, for example, an optical recording medium such as a digital versatile disc, a phase change rewritable disk (PD), a magneto-optical recording medium such as a magneto-optical disk, a tape medium, a magnetic recording medium, or a semiconductor memory.

The GPS 509 measures and acquires a longitude and a latitude corresponding to the current position of the communication terminal 200.

When the computer 500 serves as the communication terminal 200 in the embodiment of the first embodiment, the CPU 501 of the computer 500 executes the program loaded on the RAM 502 to realize the functions of the acquisition unit 221, the encapsulation unit 222, and the transmission unit 223. In addition, the IPv6 address 241 is stored in the HDD 504.

Some embodiments of the invention have been described in detail with reference to the drawings, but are example, and the invention may be embodied by other aspects subjected to various modifications and improvements based on the knowledge of a person skilled in the art from the aspect in the section disclosed in the invention.

The "unit" described in claims may be replaced by a "section," "module," or "circuit". For example, the reception unit may be replaced by a reception section or a reception circuit.

In addition, among the processes described in the embodiments, all or a part of the processes (for example, the log-in process) described as be automatically performed may be manually performed, or all or a part of the processes described as being manually performed may be automatically performed by the known method. In addition, the process sequence described in the document and drawings, the control sequence, the specific name, the information including various kinds of data and parameters may be arbitrarily modified except for a case of special mention.

In addition, the constituent elements of the illustrated devices are functionally conceptual elements, and it is not necessary to be configured as illustrated physically. That is, a specific aspect of dispersion and integration of the devices is not limited to what is illustrated, and all or a part thereof may be configured by functional or physical dispersion and integration for each arbitrary unit according to various loads and use circumstances. For example, the reception unit and the authentication control unit may be integrated.

As described above, by using the invention, it is possible to recognize a user based on identification information of a transmission source included in an access request transmitted from a terminal, and thus it is possible to obtain an effect of simply acquiring user information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
a reception unit configured to receive an access request from a terminal, the access request including identification information identifying the terminal which sends the access request, wherein the reception unit receives an IPv6 packet as the access request, and wherein an authentication control unit uses a transmission source IP address set in the IPv6 packet received by the reception unit, as the identification information;
a transfer unit configured to extract a second IPv4 packet, from a first IPv4 packet including, by additional encapsulation, the IPv6 packet including, by encapsulation, the second IPv4 packet including a transfer destination IP address, and transfer the second IPv4 packet to a device corresponding to the transfer destination IP address, wherein the reception unit allows a storage unit to store history information in which the transmission source IP address included in the IPv6 packet is associated with the transfer destination IP address included in the second IPv4 packet; and
a control unit configured to acquire user information that is information about a user using the terminal based on the identification information included in the access request.

2. The information processing device according to claim 1, wherein the storage unit is configured to store identification information of one transmission source corresponding to each application of the terminal and a log-in state of the terminal, and
wherein the authentication control unit is configured to control whether to request an authentication information to the terminal based on the log-in state stored in the storage unit by associating to the identification information included in the access request,
wherein the reception unit receives the access request including the identification information from an arbitrary application.

3. The information processing device according to claim 2, wherein the authentication control unit does not request the authentication information to the terminal when the log-in state corresponding to the identification information included in the access request represents logging-in, and requests the authentication information to the terminal when the log-in state represents non-logging-in.

4. The information processing device according to claim 2, wherein the reception unit receives a first packet including, by encapsulation, a second packet including the identification information, as the access request, and
wherein the authentication control unit controls whether to request the authentication information based on the log-in state corresponding to the identification information included in the second packet.

5. The information processing device according to claim 1, further comprising a providing unit configured to provide a service corresponding to the identification information to a user.

6. A system comprising:
an information processing device according to claim 1; and
a terminal,
wherein the terminal comprises:
a storage unit configured to store identification information of one transmission source corresponding to each application;
an acquisition unit configured to acquire the identification information from the storage unit when being accessed by any one of the applications;
a generation unit configured to generate a first packet including a second packet including the identification information; and
a transmission unit configured to transmit the first packet to the information processing device.

7. An information processing method performed by an information processing device, the information processing method comprising:
receiving an access request from a terminal, the access request including identification information identifying the terminal which sends the access request, wherein in the receiving of the access request, an IPv6 packet is received as the access request;
controlling weather to request authentication information to the terminal, a transmission source IP address set in the IPv6 packet received by the receiving is used as identification information;
extracting a second IPv4 packet, from a first IPv4 packet including, by additional encapsulation, the IPv6 packet including, by encapsulation, the second IPv4 packet including a transfer destination IP address, and transferring the second IPv4 packet to a device corresponding to the transfer destination IP address, wherein in the receiving of the access request, history information in which the transmission source IP address included in the IPv6 packet is associated with the transfer destination IP address included in the second IPv4 packet is further stored in a storage unit; and
acquiring user information that is information about a user using the terminal based on the identification information included in the access request.

8. The information processing method according to claim 7, further comprising:
receiving, in the receiving of the access request, the access request including identification information of a transmission source from an arbitrary application;
acquiring, by the information processing device, a log-in state stored in the storage unit by associating to the identification information included in the access request from the storage unit storing the identification information of one transmission source corresponding to each application of the terminal and the log-in state of the terminal; and
wherein controlling whether to request authentication information to the terminal is based on the acquired log-in state.

9. The information processing method according to claim 8, wherein in the controlling whether to request the authentication information to the terminal, the authentication information is not requested to the terminal when the log-in state corresponding to the identification information included in the access request represents logging-in, and the authentication information is requested to the terminal when the log-in state represents non-logging-in.

10. The information processing method according to claim 8, wherein in the receiving of the access request, a first packet including, by encapsulation, a second packet including the identification information, as the access request is received, and
wherein in the controlling whether to request the authentication information to the terminal, whether to request the authentication information based on the log-in state corresponding to the identification information included in the second packet is controlled.

11. The information processing method according to claim 8, further comprising providing a service corresponding to the identification information to a user.

12. An information processing device comprising:
- a reception unit configured to receive an access request including identification information of a transmission source from a terminal;
- a control unit configured to acquire user information that is information about a user using the terminal based on the identification information included in the access request;
- a storage unit configured to store identification information of one transmission source corresponding to each application of the terminal and a log-in state of the terminal;
- an authentication control unit configured to control whether to request an authentication information to the terminal based on the log-in state stored in the storage unit by associating to the identification information included in the access request,
- wherein the reception unit receives the access request including the identification information from an arbitrary application,
- wherein the reception unit receives an IPv6 packet as the access request, and
- wherein the authentication control unit uses a transmission source IP address set in the IPv6 packet received by the reception unit, as the identification information;
- a transfer unit configured to extract a second IPv4 packet, from a first IPv4 packet including, by additional encapsulation, the IPv6 packet including, by encapsulation, the second IPv4 packet including a transfer destination IP address, and transfers the second IPv4 packet to a device corresponding to the transfer destination IP address,
- wherein the reception unit allows the storage unit to further store history information in which the transmission source IP address included in the IPv6 packet is associated with the transfer destination IP address included in the second IPv4 packet.

* * * * *